US006681984B2

(12) United States Patent
Brunner

(10) Patent No.: US 6,681,984 B2

(45) Date of Patent: Jan. 27, 2004

(54) GAMING CASH MANAGEMENT SLIP AND METHOD

(75) Inventor: Ronld F. Brunner, Wayne, PA (US)

(73) Assignee: Currency Counting Consultants, Inc., King of Prussia, PA (US)

(*) Notice: Subject to any disclaimer, the term of this patent is extended or adjusted under 35 U.S.C. 154(b) by 125 days.

(21) Appl. No.: 09/965,535

(22) Filed: Sep. 26, 2001

(65) Prior Publication Data

US 2003/0057269 A1 Mar. 27, 2003

(51) Int. Cl.[7] ........ G06F 17/00

(52) U.S. Cl. ........ 235/375; 235/487

(58) Field of Search ........ 235/375, 380, 235/379, 487

(56) References Cited

U.S. PATENT DOCUMENTS 4,191,376 A * 3/1980 Goldman et al. ........ 273/139
4,962,950 A * 10/1990 Champion ........ 283/67
5,129,652 A * 7/1992 Wilkinson ........ 273/139
5,489,096 A * 2/1996 Aron ........ 273/138.1
2002/0084327 A1 * 7/2002 Ehrhart et al. ........ 235/454
2003/0042317 A1 * 3/2003 Behm et al. ........ 235/487

* cited by examiner

*Primary Examiner*—Karl D. Frech
(74) *Attorney, Agent, or Firm*—Eugene E. Renz, Jr.

(57) ABSTRACT

The invention is a cash management slip and method of using the slip in casino operations. The cash management slip and method applies particularly to the process of paying a jackpot awarded by a gaming machine, such as a slot machine, and to the filling with cash of a gaming machine. The present invention provides machine-readable indicia on casino cash management slips and further provides for the automated checking and reconciliation of those slips at the end of the gaming day.

24 Claims, 5 Drawing Sheets

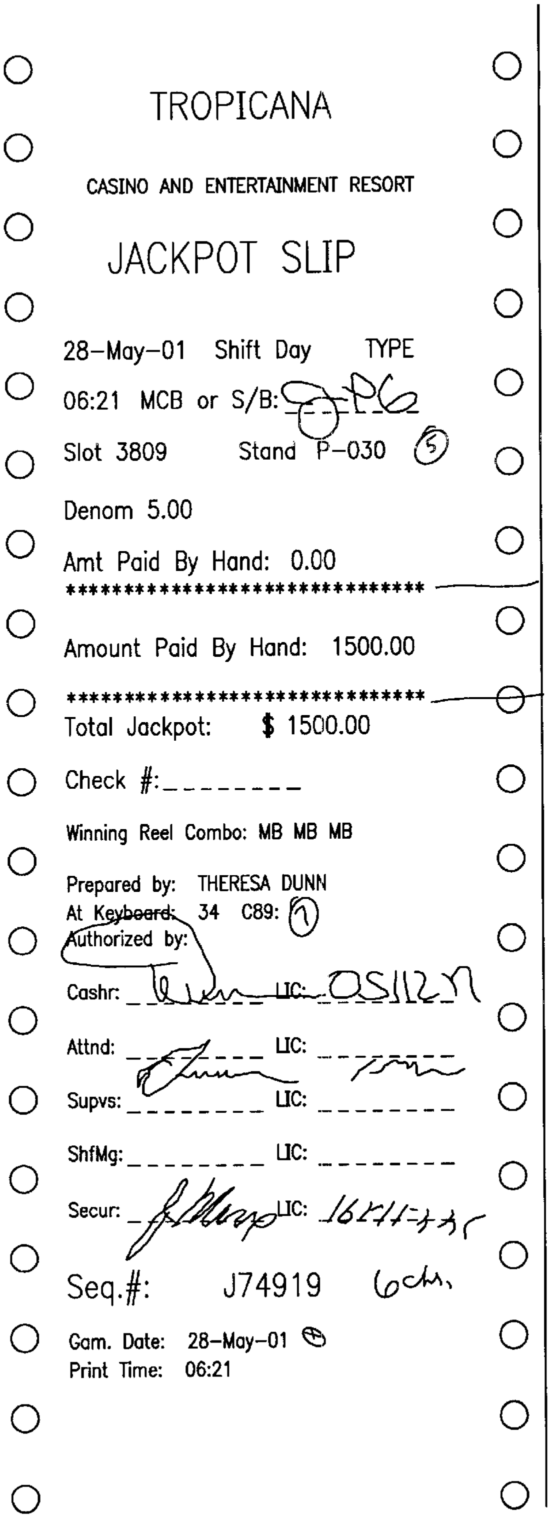
TROPICANA
CASINO AND ENTERTAINMENT RESORT
JACKPOT SLIP
28-May-01 Shift Day TYPE
06:21 MCB or S/B:
Slot 3809 Stand P-030
Denom 5.00
Amt Paid By Hand: 0.00
*******************************
Amount Paid By Hand: 1500.00
*******************************
Total Jackpot: $ 1500.00
Check #:________
Winning Reel Combo: MB MB MB
Prepared by: THERESA DUNN
At Keyboard: 34 C89:
Authorized by:
Cashr:________ LIC:________
Attnd:________ LIC:________
Supvs:________ LIC:________
ShfMg:________ LIC:________
Secur:________ LIC:________
Seq.#: J74919
Gam. Date: 28-May-01
Print Time: 06:21

FIG. 3

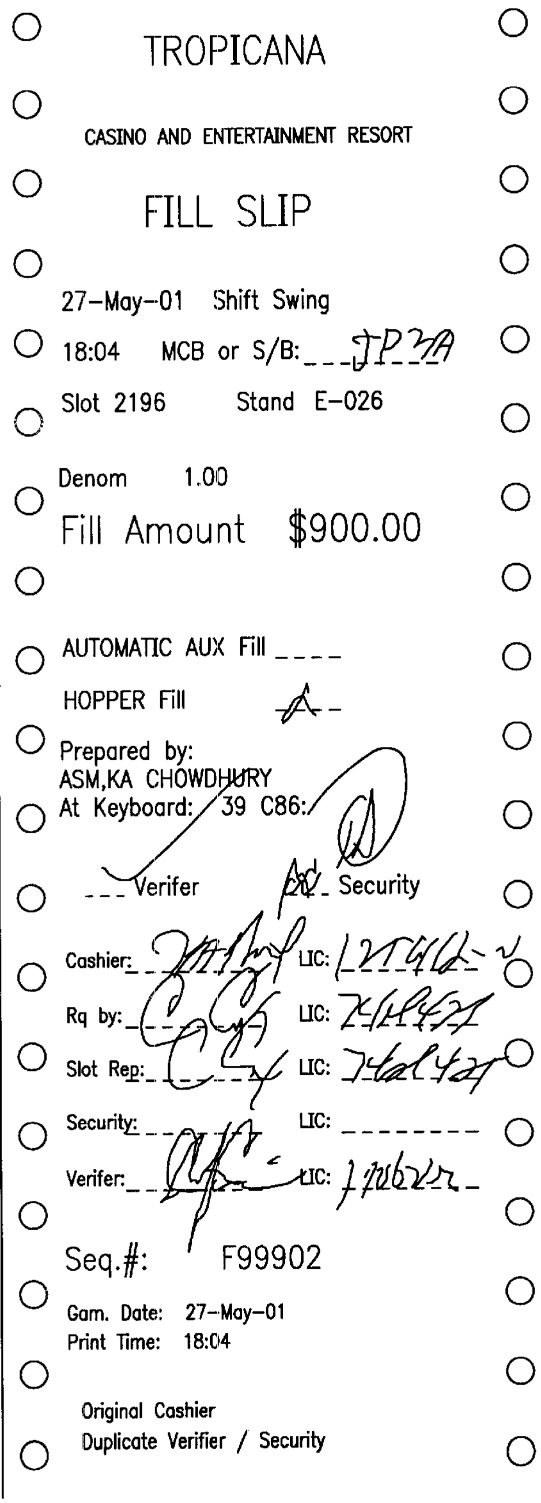
TROPICANA
CASINO AND ENTERTAINMENT RESORT
FILL SLIP
27-May-01 Shift Swing
18:04 MCB or S/B:________
Slot 2196 Stand E-026
Denom 1.00
Fill Amount $900.00
AUTOMATIC AUX Fill ____
HOPPER Fill ____
Prepared by:
ASM,KA CHOWDHURY
At Keyboard: 39 C86:
___Verifer ___Security
Cashier:________ LIC:________
Rq by:________ LIC:________
Slot Rep:________ LIC:________
Security:________ LIC:________
Verifer:________ LIC:________
Seq.#: F99902
Gam. Date: 27-May-01
Print Time: 18:04
Original Cashier
Duplicate Verifier / Security

FIG. 4

GAMING CASH MANAGEMENT SLIP AND METHOD

BACKGROUND OF THE INVENTION

1. Field of the Invention

This invention relates to a cash management slip and method of using said cash management slip for improving the efficiency of cash management within a casino. The present invention particularly relates to the system of documenting cash jackpots paid by gaming machines in a casino and the system of documenting cash used to fill gaming machines.

2. Description of the Prior Art

Definitions:

For the purposes of this application, a "casino" is any gaming establishment. A "gaming machine" is any mechanized game of chance, such as a slot machine, used for gaming purposes. A "jackpot" is money paid to a winning player of a gaming machine by the operator of a casino. "Filling" of a gaming machine is the placing of cash inside the gaming machine to be discharged to a winning player.

Gaming Machine Jackpot Security:

Casino cashiers disburse large amounts of cash, both in the form of jackpots paid to winning players and amounts disbursed to fill gaming machines. Elaborate security systems requiring concurrence of several persons and duplicate security checks have evolved to protect the casino from theft, particularly in the payment of jackpots and in the filling of gaming machines.

In a prior-art casino, a gaming machine transmits an electronic record of a jackpot directly to the casino computer system. If the amount of the jackpot is small, the gaming machine may pay cash directly to the winning player. If the amount of the jackpot is too large to be paid directly by the gaming machine, the casino computer system will cause a jackpot slip to be printed. The gaming machine attendant will collect the jackpot slip from the printer. The attendant, a supervisor and a security guard will all sign the jackpot slip, thereby attesting the proper operation of the gaming machine and that the gaming machine actually indicated that a jackpot should be paid.

The jackpot slip has two parts, both of which bear the same unique identifier. The unique identifier may comprise a sequence number. One portion of the jackpot slip (the "security jackpot slip") is retained by the security guard. The security guard transports the security jackpot slip security portion to a collection location under the care of the casino security apparatus.

The attendant transports the second portion of the jackpot slip ("cashier jackpot slip") to a cashier who accepts the cashier jackpot slip and either issues a check or cash to the attendant in the amount indicated by the cashier jackpot slip. The attendant then gives the check or cash to the winning player.

Gaming Machine Fill Security:

If a jackpot is adequately small, the jackpot may be paid to the winning player directly by the gaming machine. Periodically the money in the gaming machine must be replenished. The casino computer system monitors jackpots paid by the gaming machine and notes the need of the machine to be filled; alternatively, the gaming machine attendant may request that the machine be filled. The casino computer system will print a "fill slip" having two portions, both of which include a unique identifier. The unique identifier may comprise a sequence number.

The attendant takes the two portions of the fill slip to a cashier, who removes one part (the "cashier fill slip") and provides the attendant with cash in the amount indicated by the cashier fill slip. The attendant then takes the second portion of the fill slip ("security fill slip") and the cash to the gaming machine to be filled. The attendant, a supervisor and a security guard all sign the security fill slip, documenting that the attendant actually fills the gaming machine. The security guard then deposits the security fill slip security portion at a location under the control of the casino security apparatus.

Casino Accounting and Security Checks:

When the cashier accounts for the cash in his or her till, the cashier must match cash paid out with cashier jackpot slips and cashier fill slips in the till. This provides a first check against a cashier simply stealing from the till.

At the end of the gaming day, all of the cashier jackpot slips and security jackpot slips are collected from the cashiers and from casino security. The cashier jackpot and fill slips are matched to the security jackpot and fill slips. If a cashier jackpot slip or cashier fill slip does not match a corresponding security jackpot slip or security fill slip, the matter is investigated to determine the cause of the discrepancy. One possible cause of a discrepancy is fraud or theft.

The requirement for multiple approvals from different persons to document each transaction guards against fraud and secures employee accountability in the payment of jackpots and machine fill requests. The use of two-part fill and jackpot slips discourages a gaming machine attendant or cashier from printing false jackpot slips and thereby collecting false jackpots.

In the prior art, the task of matching security jackpot slips with cashier jackpot slips and the task of matching security fill slips with cashier fill slips is performed manually. Crews of casino employees sort each of the security jackpot slips, cashier jackpot slips, security fill slips and cashier fill slips. The crew of employees matches each slip with its counterpart and checks that the information on the corresponding slips is consistent and correct. If the crew determines that corresponding slips are not consistent, the matter is referred for investigation. The manual process of checking slips is time consuming, expensive and subject to operator error. The present invention speeds the job of checking the jackpot slips and fill slips by providing a bar code on each slip that is machine readable so that the paper slips can be matched electronically. All of the safeguards of the existing system are preserved, but the job of checking the slips is more accurate, faster and more economical.

SUMMARY OF THE INVENTION

This invention provides machine-readable codes applied to each security jackpot slip, cashier jackpot slip, security fill slip and cashier fill slip. The codes are adequately unique to allow each slip generated in a gaming day to be differentiated from every other slip generated during that day. A code may comprise a bar code imprinted on each slip. The bar codes may encode relevant information about the jackpot or fill transaction. The cash management slips may be printed using a printer that is specially programmed to receive a print command in any of a number of formats and to automatically reformat the cash management slips to include a bar code. The cash management slips of the present invention thereby may be implemented by connecting the specially programmed printer to an existing casino computer system without changing existing casino software.

The security fill slip, cashier fill slip, security jackpot slip and cashier jackpot slip of the present invention are used to prevent theft and fraud in the same manner and using the same procedures as the prior art. The present invention differs from the prior art in that at the end of the gaming day each bar code of each slip is optically scanned. The scanning of each slip creates a data file that is stored in the casino computer system. The casino computer system electronically compares the information encoded in the bar code on, say, a security jackpot slip with the corresponding cashier jackpot slip. Similarly, the casino computer system electronically compares the information encoded in the bar code of a security fill slip with the corresponding cashier fill slip. If the information encoded on the slips is consistent, the computer concludes that the transaction was properly recorded. If a slip is recorded for which no corresponding slip is found, or if the information on corresponding slips is not consistent, then the computer refers the matter for investigation by human operators.

The invention eliminates the laborious clerical task of matching and checking many different forms, with resulting savings in labor and improvements in accuracy and efficiency.

The foregoing and other advantages and features of this invention will appear from the following detailed description, taken in connection with the accompanying drawings.

BRIEF DESCRIPTION OF THE DRAWINGS

FIG. 3 is a prior art jackpot slip.

FIG. 4 is a prior art fill slip.

DESCRIPTION OF THE PREFERRED EMBODIMENT

Figure 1:
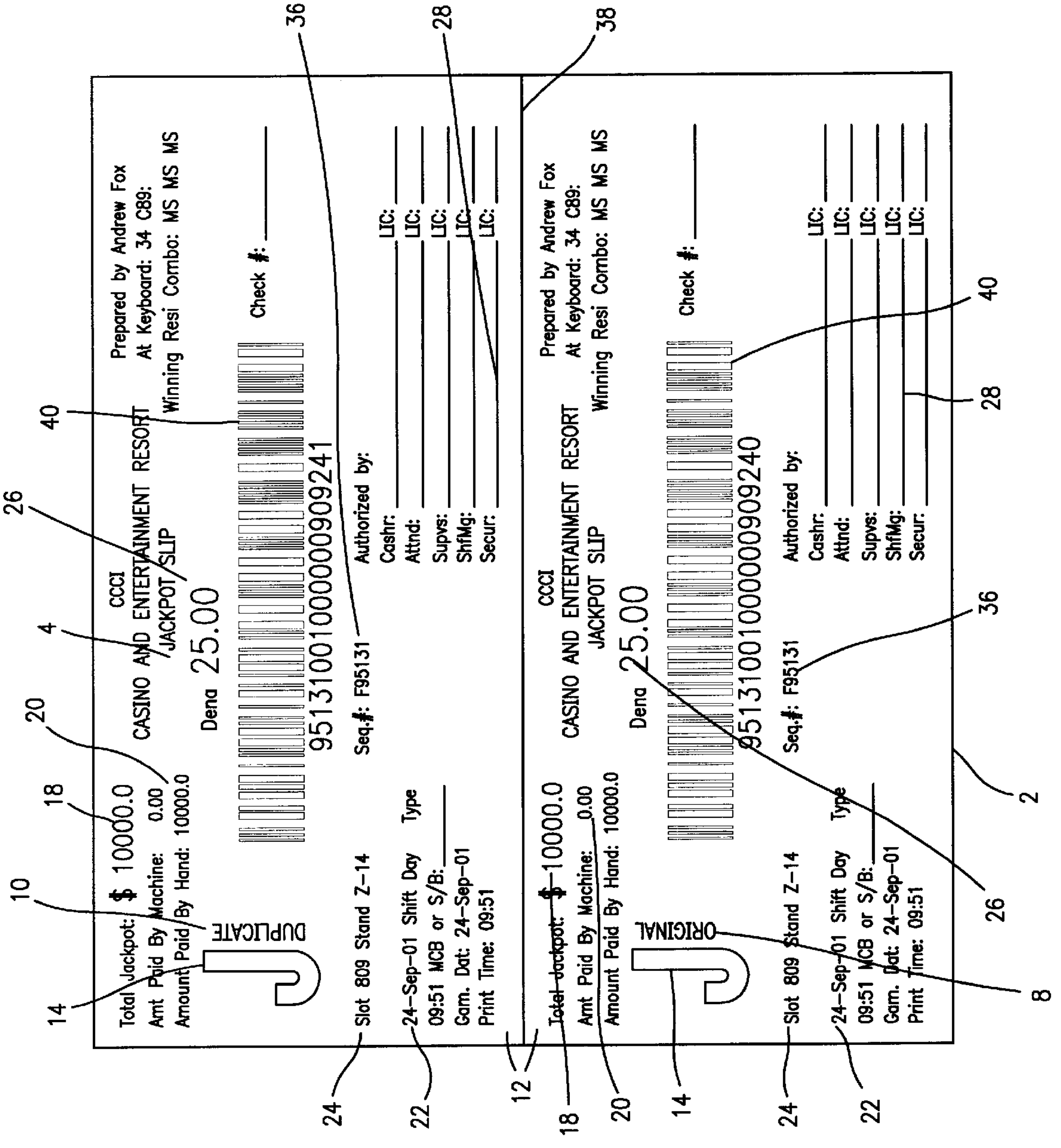
FIG. 1 is a jackpot slip of the present invention.
Figure 2:
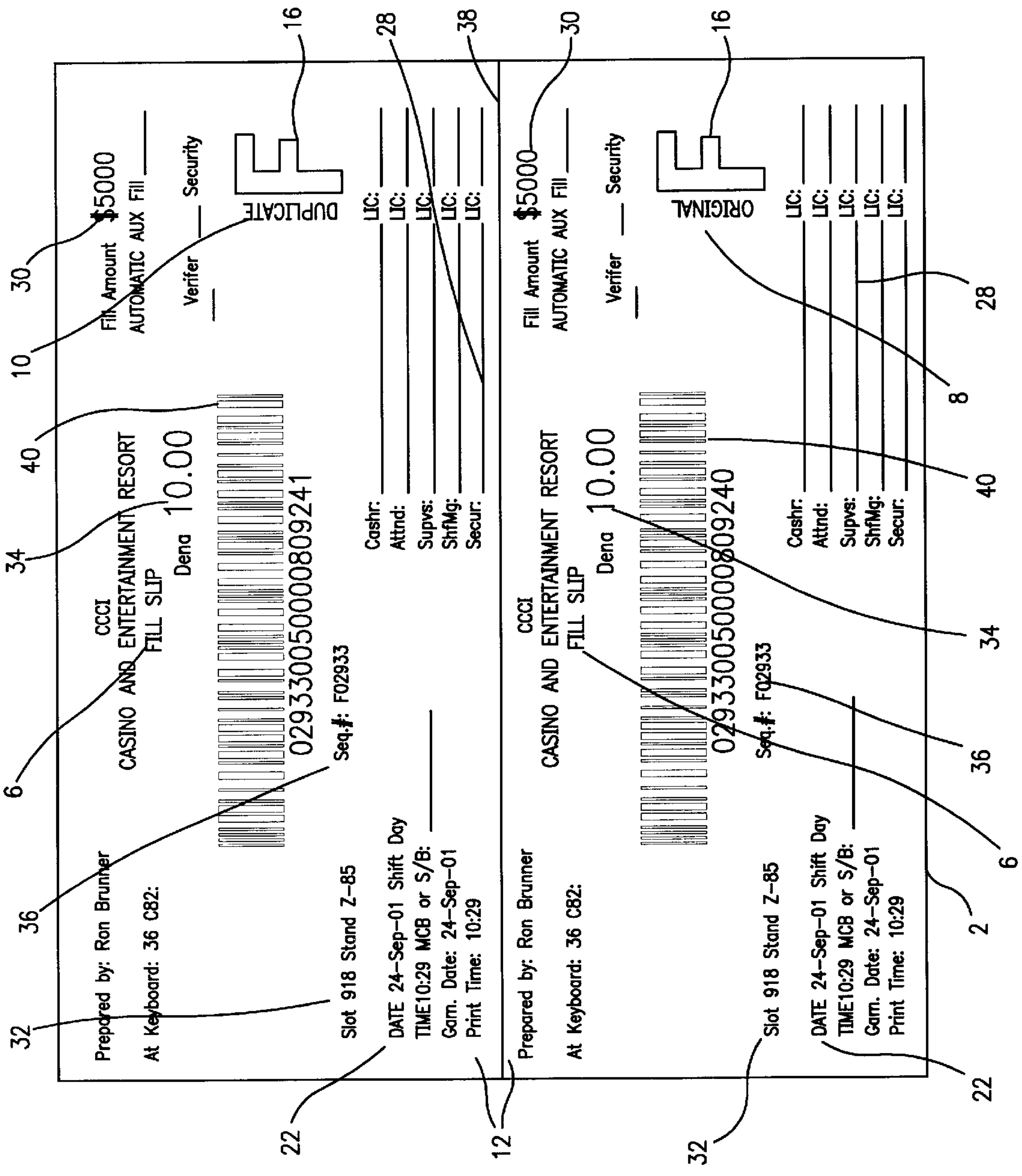
FIG. 2 is a fill slip of the present invention.

FIG. 1 is an example of the cash management slip 2 of the present invention. The cash management slip 2 appears in two forms, the jackpot slip 4 (FIG. 1) and the fill slip 6 (FIG. 2). The jackpot slip 4 is used to document the payment of cash to a winning player of a gaming machine. The fill slip 6 is used to document the handling of money used to stock a gaming machine. The cash management slip 2 comprises two portions, the cashier portion 8 and the security portion 10. The cashier portion 8 and security portion 10 are marked with a first indicia 12 to allow ready differentiation between them by human operators. Preferably, the first indicia 12 comprises printing the cashier portion 8 on white substrate and printing the security portion 10 on a canary yellow substrate. The preferred substrate is paper.

A second indicia 14 appears on the cash management slips 2 to differentiate jackpot slips 4 from fill slips 6. Preferably, the second indicia 14 on jackpot slips 4 (FIG. 1) comprises a large letter "J." The fill slip second indicia 16 (FIG. 2) comprises a large letter "F."

Various items of information are printed on the cash management slip 2. For a jackpot slip 4, the information includes the jackpot amount 18, the amounts paid machine and by hand 20, the date and time 22, identification of the gaming machine 24, the denomination of the currency used 26. The jackpot slip 4 also includes spaces 28 for required signatures authorizing the various steps of payment of the jackpot.

For a fill slip 6, the information printed on the slip includes a fill amount 30, an identification of the gaming machine to be filled 32, the date and time 22, and the denomination of currency with which the machine is to be filled 34.

The jackpot slip incorporates a sequence number 36 that is identical between the jackpot slip 4 cashier portion 8 and the jackpot slip 4 security portion 10. The sequence number 36 allows the cashier portion 8 to be reliably matched to the security portion 10.

The cashier portion 8 and the security portion 10 initially are attached, but can be detached at a center perforation 38.

The cash management slip 2 incorporates machine readable indicia 40 printed on the cashier portion 8 and the security portion 10. The preferred machine readable indicia 40 is a bar code that is readable using an optical scanner. All machine-readable systems of encoding information are contemplated by the invention, including without limitation punched holes, magnetic strips, radial or concentric patterns, binary patterns, reflective materials, holograms, and every other manner of encoding information on a physical object so that the information can be read by a machine. The machine readable indicia 40 encodes the sequence number 36, allowing cashier portions 8 and security portions 10 to be matched by machine. The machine readable indicia 40 also includes various items of information that the gaming establishment management wishes to capture, such as the denomination of the currency 26, 34 the amount of a jackpot 16 or fill 30, date and time 22 and all other desired information.

The cash management slip 2 preferably is printed using a Zebra Z6M printer. The Zebra Z6M printer is specially programmed to receive a print command generated by the casino computer system in any of a variety of printing formats and automatically to reformat the printed cash management slip 2 into the form of the invention and including the machine readable indicia 40 of the invention. The specially programmed Zebra Z6M printer may be connected and operated without altering the casino computer system or changing the programming of the casino computer system. The cash management form 2 and method of the invention may therefore be implemented without interfering with the existing operation of a casino computer system.

The machine readable indicia 40 for a jackpot slip 4 preferably comprises a sequence of 20 characters. The first five characters of the jackpot slip 4 machine readable indicia 40 comprise the sequence number 36. The next eight characters encode the total amount of the jackpot 18. The following two numbers in the sequence encode the denomination 26 of the currency used to pay the jackpot. The preferred code for the currency denomination 26 is as shown in Chart 1, below.

CHART 1

| Denomination (dollars) | Code |
|---|---|
| .05 | 01 |
| .10 | 02 |
| .25 | 03 |
| .50 | 04 |
| 1.00 | 05 |
| 2.00 | 06 |
| 5.00 | 07 |
| 10.00 | 08 |
| 20.00 | 09 |

CHART 1-continued

| Denomination (dollars) | Code |
|---|---|
| 50.00 | 10 |
| 100.00 | 11 |

Following the currency denomination specification, four characters specify the game date. One character specifies whether a cash management slip 2 is a cashier portion 8 or a security portion 10. Of course, the bar code 40 sequence can be established to capture any information desired by the operator of the gaming establishment.

A fill slip 6 machine readable indicia 40 preferably includes 18 characters. The character descriptions for a fill slip 6 are similar to those for jackpot slip 4 as noted above, except that the fill slip 6 machine readable indicia 40 provides six characters to define the amount of cash to be filled into a machine rather than the eight characters provide on the jackpot slip 4 machine readable indicia 40 to define the amount of a jackpot.

The principal difference between the cash management slip 2 (FIGS. 1 and 2) of the present invention and the prior art slips (FIG. 3 and FIG. 4) is the inclusion of the machine-readable indicia 40 on the cash management slip 2.

Figure 5:
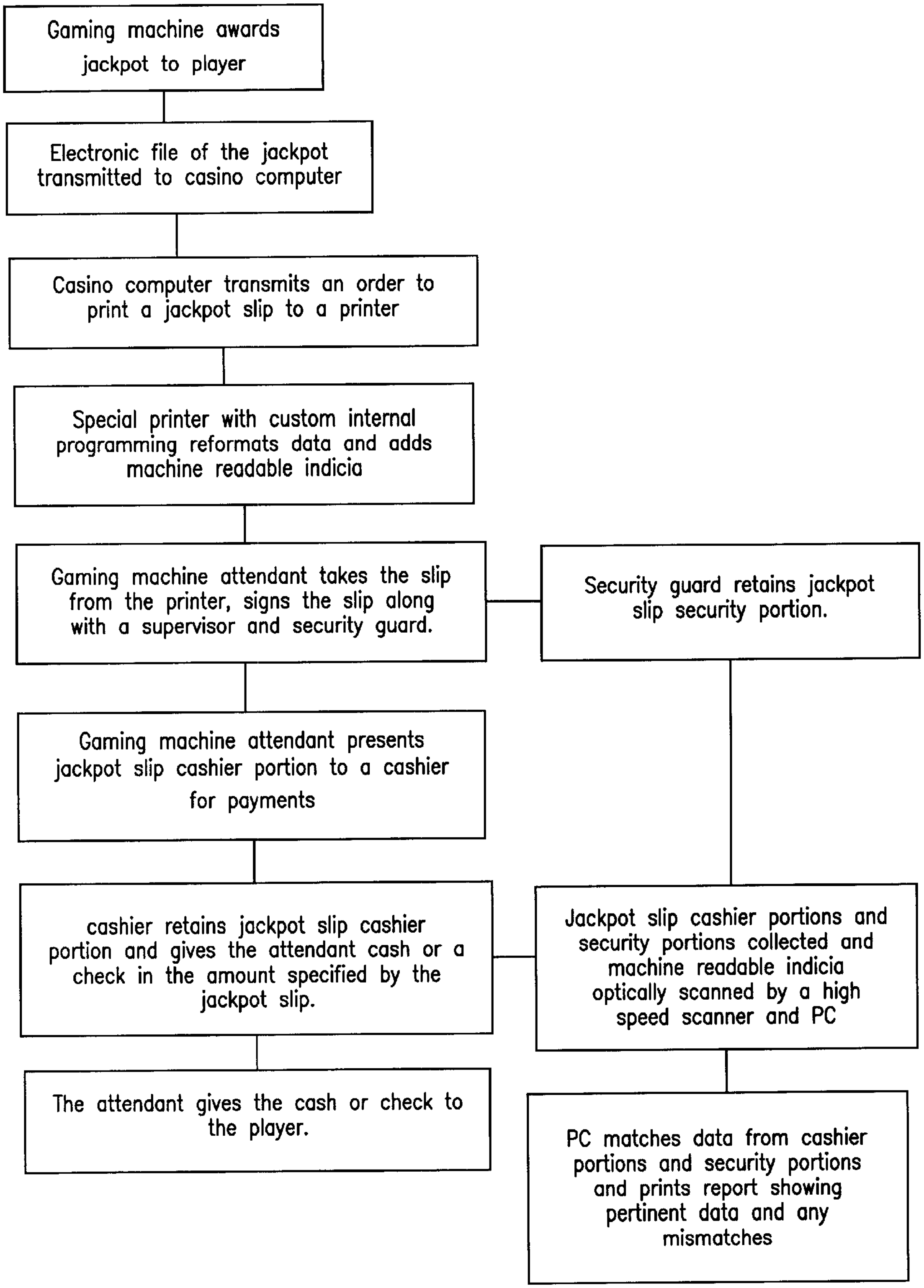
FIG. 5 is a flow chart of the present invention for gaming machine jackpots.
Figure 6:
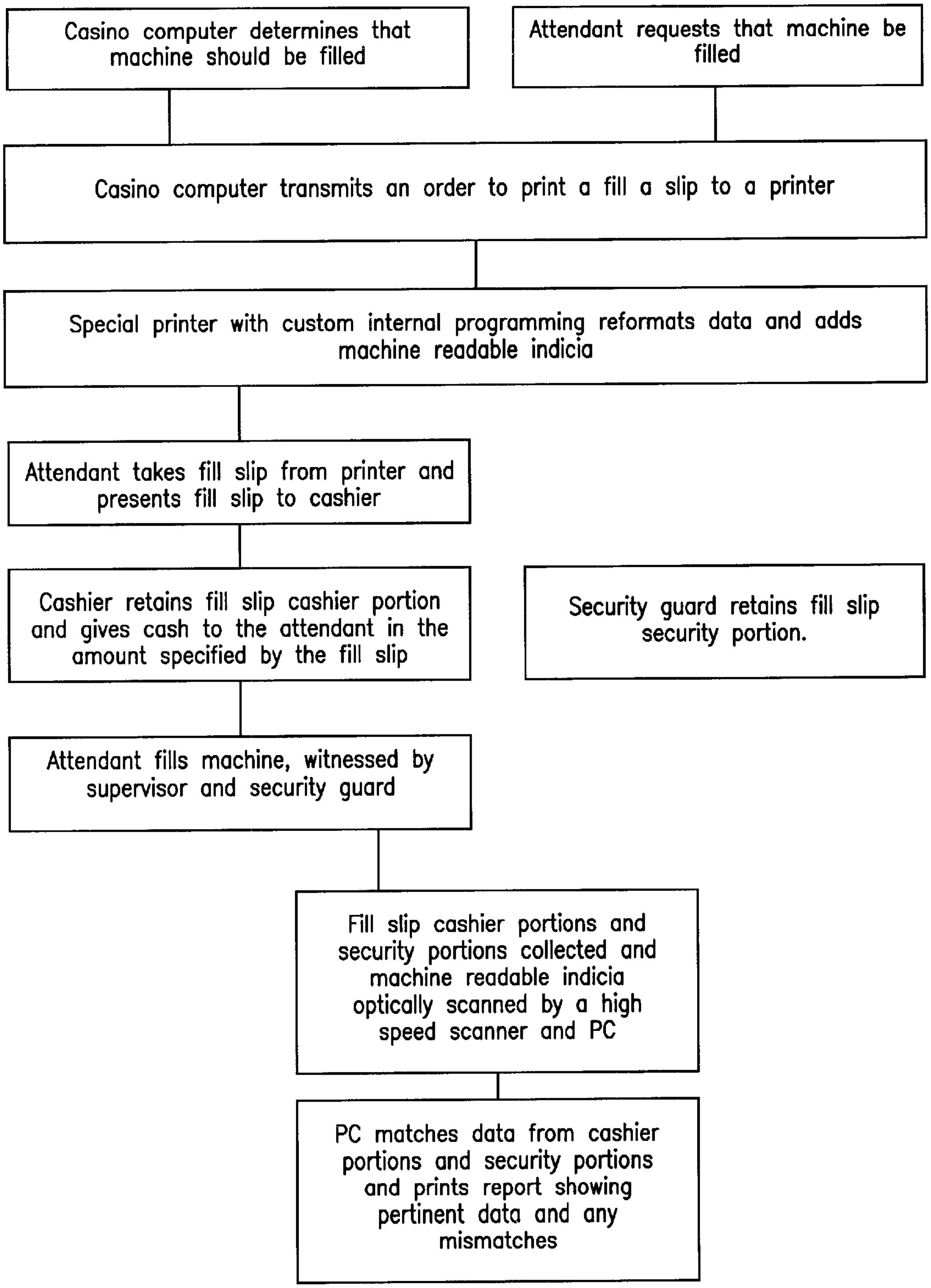
FIG. 6 is a flow chart of the present invention for filling of gaming machines.

The method of use of the cash management slip 2 is illustrated by FIG. 5 (jackpot slip 4) and FIG. 6 (fill slip 6). For a jackpot slip 4, a gaming machine awards a jackpot to a player. A computer system monitors the gaming machine and orders a jackpot slip 4 to be printed. The printer prints a jackpot slip 4 including a machine readable indicia 40. An attendant collects the jackpot slip 2. The attendant, a supervisor and a security guard ("verifiers") inspect the gaming machine to verify that a jackpot is authorized. If a jackpot is authorized, each of the verifiers signs the jackpot slip 4. The jackpot slip 4 is separated at the perforation 38 and the security guard retains the security portion 10 of the jackpot slip 4. The attendant presents the cashier portion 8 of the jackpot slip 4 to a cashier. The cashier signs and retains the cashier portion 8 and dispenses cash or a check to the attendant in the amount specified on the cashier portion 8. The attendant presents the cash or check to the winning player.

For a fill slip 6, an attendant or a monitoring computer determines that a gaming machine should be filled. A fill slip 6 is printed, including a machine readable indicia 40. The attendant presents the fill slip to a cashier. The cashier separates the cashier portion 8 of the fill slip 6 from the security portion 10 of the fill slip 6 at the perforation 38. The cashier retains the cashier portion 8 and provides cash to the attendant to fill the gaming machine. The attendant takes the cash and the security portion to the gaming machine to be filled. The attendant fills the machine, witnessed by verifiers. The attendant and the verifiers sign the security portion 10, which is retained by a security guard.

For both jackpot slips 4 and fill slips 6, all of the cashier portions 8 and security portions 10 of the jackpot slips 4 and fill slips 6 are collected at the end of the gaming day. Each cashier portion 8 and each security portion 10 is fed into a high-speed optical scanner, preferably a Multiscan MT-31. The scanner reads the machine readable indicia 40 and creates data files that are stored on a computer. The computer compares the data files to determine whether a security portion 10 exists corresponding to each cashier portion 8. If the scanner is unable to read a cashier portion 8 or security portion 10, the portion is rejected and the data entered manually. If the computer is unable to determine that a corresponding security portion 10 matches a cashier portion 8, the computer notifies a human operator so that the discrepancy may be investigated. One possible source of a discrepancy is theft or fraud.

Although the preferred embodiment is that all cashier portions 8 and all security portions 10 are scanned at the end of the gaming day, the portions 8, 10 may be scanned at other times during the day or as each transaction is completed.

In the preferred embodiment, the cash management slip 2 is printed in a fanfold style on 0.5 mil paper stock. The length of each cash management slip is 6.5 inches long and 5.5 inches wide. Each cash management slip is separated from preceding and succeeding cash management slips by end perforations. The present invention applies to the management of casino tokens as well as to the management of cash and as used herein the word cash means both cash and tokens.

Many different embodiments of the above invention are possible. This application is intended to address all possible embodiments and is limited only as described in the following claims.

I claim:

1. A casino cash management slip comprising:

a) a security portion;

b) a cashier portion;

c) a machine readable indicia appearing on said security portion;

d) a machine readable indicia appearing on said cashier portion; and e) said machine readable indicia on each of said security portion and said cashier portion being sufficiently different to allow said security portion and said cashier portion to be matched one with another.

2. The slip of claim 1, said machine readable indicia appearing on said security portion and said cashier portion comprising indicia that may be optically scanned.

3. The slip of claim 2, said indicia that may be optically scanned comprising a plurality of bar codes.

4. The slip of claim 3, said plurality of bar codes encoding a sequence number.

5. The slip of claim 3, said slip being a jackpot slip, said bar codes appearing on said security portion and said bar codes appearing on said cashier portion encoding gaming machine jackpot information.

6. The slip of claim 5, said gaming machine jackpot information comprising:

a. a total amount of a jackpot;

b. a denomination indicator;

c. a date;

d. an indicator as to whether said slip is said security slip or said cashier slip.

7. The slip of claim 3, said slip being a fill slip, said bar codes appearing on said security portion and said bar codes appearing on said cashier portion encoding gaming machine fill information.

8. The slip of claim 7, said gaming machine fill information comprising:

a. a fill amount;

b. a denomination indicator;

c. a date;

d. an indicator as to whether said slip is said security slip or said cashier slip.

9. The slip of claim 2, said security portion and said cashier portion further providing a first indicia to allow a human operator to readily differentiate said security portion from said cashier portion of said slip.

10. The slip of claim 9, said first indicia comprising said security portion being of a color different from said cashier portion.

11. The slip of claim 10, said slip being one of a jackpot slip or a fill slip, said security portion and said cashier portion having a second indicia to allow said human operator to readily determine whether said slip is said jackpot slip or said fill slip.

12. A method for managing gaming machine cash transactions in a casino comprising the steps of:

a) preparing a cash management slip having a security portion and a cashier portion, each of said portions bearing machine readable indicia sufficiently different to allow said security portion and said cashier portion to be matched one with another;

b) documenting a disbursement of cash by a cashier using said cashier portion;

c) documenting conditions relating to disposition of cash by verification personnel using said security portion;

d) reading by a machine of said machine readable code on said security portion and said cashier portion;

e) generating a data file for said security portion and said cashier portion; and f) comparing said data files to determine whether said security portion and said cashier portion match.

13. The method of claim 12, said comparing of said data files being accomplished by automated means.

14. The method of claim 13, said documenting of disbursement of cash by a cashier comprising said cashier accepting custody of said cashier portion upon disbursement of cash by said cashier.

15. The method of claim 13 comprising the further step of extracting and compiling information from said data files.

16. The method of claim 15, said extracted and compiled information comprising:

a) a count of all said cash management slips;

b) a total amount for each denomination of currency;

c) a total amount for all amounts paid.

17. A method for managing gaming machine cash transactions in a casino comprising the steps of:

a) preparing a jackpot slip having a security portion and a cashier portion, each of said portions bearing machine readable indicia sufficiently different to allow said security portion and said cashier portion to be matched one with another;

b) documenting a disbursement of cash by a cashier using said cashier portion;

c) documenting conditions relating to disposition of cash by verification personnel using said security portion;

d) reading by a machine of said machine readable code on said security portion and said cashier portion;

e) generating a data file for said security portion and said cashier portion; and f) comparing said data files to determine whether said security portion and said cashier portion match.

18. A method for managing gaming machine cash transactions in a casino comprising the steps of:

a) preparing a cash management slip having a security portion and a cashier portion, said machine readable indicia on each of said security portion and said cashier portion being sufficiently unique including at least one digit which is different in each bar code to allow said security portion and said cashier portion to be matched one with another;

b) documenting a disbursement of cash by a cashier using said cashier portion;

c) documenting conditions relating to disposition of cash by verification personnel using said security portion;

d) reading by a machine of said machine readable code on said security portion and said cashier portion;

e) generating a data file for said security portion and said cashier portion;

f) comparing said data files to determine whether said security portion and said cashier portion match; and g) said machine readable indicia on each of said security portion and said cashier portion being sufficiently unique including at least one digit which is different in each bar code to allow said security portion and said cashier portion to be matched one with another.

19. A method for managing gaming machine cash transactions in a casino comprising the steps of:

a) preparing a jackpot slip having a security portion and a cashier portion, each of said portions bearing machine readable indicia sufficiently unique to allow each of said security portion and said cashier portion to be matched one with another;

b) documenting a disbursement of cash by a cashier using said cashier portion by said cashier accepting custody of said cashier portion upon disbursement of cash by said cashier;

c) documenting conditions relating to disposition of cash by verification personnel using said security portion comprising confirming by verification personnel that conditions for payment of a jackpot are satisfied and assuming custody of said security portion by verification personnel;

d) reading by a machine of said machine readable code on said security portion and said cashier portion;

e) generating a data file for said security portion and said cashier portion; and f) comparing said data files by automated means to determine whether said security portion and said cashier portion match.

20. A method for managing gaming machine cash transactions in a casino comprising the steps of:

a) preparing a fill slip having a security portion and a cashier portion, each of said portions bearing machine readable indicia sufficiently unique to allow each of said security portion and said cashier portion to be matched one with another;

b) documenting a disbursement of cash by a cashier using said cashier portion by said cashier accepting custody of said cashier portion upon disbursement of cash by said cashier;

c) documenting conditions relating to disposition of cash by verification personnel using said security portion comprising confirming by verification personnel that dispensed cash actually is placed in said gaming machine and assuming custody of said security portion by verification personnel;

d) reading by a machine of said machine readable code on said security portion and said cashier portion;

e) generating a data file for said security portion and said cashier portion; and f) comparing said data files by automated means to determine whether said security portion and said cashier portion match.

21. A method for managing gaming machine cash transactions in a casino comprising the steps of:

a) preparing a fill slip having a security portion and a cashier portion, each of said portions bearing machine readable indicia sufficiently different to allow said security portion and said cashier portion to be matched one with another;

b) documenting a disbursement of cash by a cashier using said cashier portion;

c) documenting conditions relating to disposition of cash by verification personnel using said security portion;

d) reading by a machine of said machine readable code on said security portion and said cashier portion;

e) generating a data file for said security portion and said cashier portion; and f) comparing said data files to determine whether said security portion and said cashier portion match.

22. A casino jackpot slip comprising:

a) a security portion;

b) a cashier portion;

c) a machine readable indicia appearing on said security portion;

d) a machine readable indicia appearing on said cashier portion; and e) said machine readable indicia on each of said security portion and said cashier portion being sufficiently different to allow said security portion and said cashier portion to be matched one with another.

23. A casino fill slip comprising:

a) a security portion;

b) a cashier portion;

c) a machine readable indicia appearing on said security portion;

d) a machine readable indicia appearing on said cashier portion; and e) said machine readable indicia on each of said security portion and said cashier portion being sufficiently different to allow said security portion and said cashier portion to be matched one with another.

24. A casino cash management slip comprising:

a) a security portion;

b) a cashier portion;

c) a machine readable indicia appearing on said security portion;

d) a machine readable indicia appearing on said cashier portion; and e) said machine readable indicia on each of said security portion and said cashier portion being sufficiently unique including at least one digit which is different in each bar code to allow said security portion and said cashier portion to be matched one with another.

* * * * *